(12) United States Patent
Das et al.

(10) Patent No.: US 12,539,347 B2
(45) Date of Patent: Feb. 3, 2026

(54) MICROPATTERNED SILICONE OXYGENATING DRESSING FOR CHRONIC WOUNDS

(71) Applicant: The University of Toledo, Toledo, OH (US)

(72) Inventors: Chandan Das, Toledo, OH (US); Munier Nazzal, Toledo, OH (US); F. Charles Brunicardi, Toledo, OH (US)

(73) Assignee: The University of Toledo, Toledo, OH (US)

( * ) Notice: Subject to any disclaimer, the term of this patent is extended or adjusted under 35 U.S.C. 154(b) by 327 days.

(21) Appl. No.: 16/982,696

(22) PCT Filed: Mar. 21, 2019

(86) PCT No.: PCT/US2019/023328
§ 371 (c)(1),
(2) Date: Sep. 21, 2020

(87) PCT Pub. No.: WO2019/183326
PCT Pub. Date: Sep. 26, 2019

(65) Prior Publication Data
US 2021/0001001 A1    Jan. 7, 2021

Related U.S. Application Data

(60) Provisional application No. 62/646,470, filed on Mar. 22, 2018.

(51) Int. Cl.
*A61L 15/26* (2006.01)
*A61L 15/44* (2006.01)
*C08L 83/06* (2006.01)

(52) U.S. Cl.
CPC .............. *A61L 15/26* (2013.01); *A61L 15/44* (2013.01); *C08L 83/06* (2013.01); *A61L 2300/10* (2013.01); *A61L 2300/412* (2013.01)

(58) Field of Classification Search
None
See application file for complete search history.

(56) References Cited

U.S. PATENT DOCUMENTS

| | | | |
|---|---|---|---|
| 4,513,739 A * | 4/1985 | Johns | A61F 13/023 602/56 |
| 9,670,447 B2 * | 6/2017 | Das | C12M 25/02 |
| 2009/0259171 A1 * | 10/2009 | Joshi | A61K 9/0021 604/23 |
| 2011/0028918 A1 * | 2/2011 | Hartwell | A61F 13/025 604/319 |
| 2011/0247623 A1 * | 10/2011 | McCarthy | H04L 12/10 379/45 |
| 2012/0003293 A1 * | 1/2012 | Miller | A61L 15/46 604/23 |
| 2014/0107562 A1 * | 4/2014 | Dorian | A61M 1/94 604/23 |
| 2014/0212967 A1 * | 7/2014 | Das | C12N 5/0068 264/494 |
| 2017/0252488 A1 * | 9/2017 | Nosrati | A61L 27/26 |

* cited by examiner

*Primary Examiner* — Isis A Ghali
(74) *Attorney, Agent, or Firm* — MacMillan, Sobanski & Todd, LLC

(57) ABSTRACT

A wound dressing system having an oxygen-permeable membrane having a first surface and a second surface with oxygen-permeable pillars extending from the second surface is described.

21 Claims, 4 Drawing Sheets

MICROPATTERNED SILICONE OXYGENATING DRESSING FOR CHRONIC WOUNDS

CROSS-REFERENCE TO RELATED APPLICATIONS

This is application claims the priority to U.S. Provisional Application Ser. No. 62/646,470 filed Mar. 22, 2018, the entire disclosures of which are expressly incorporated herein by reference.

STATEMENT REGARDING FEDERALLY SPONSORED RESEARCH

This invention was not made with any government support, and the government has no rights in the invention.

BACKGROUND OF THE INVENTION

Chronic wounds are difficult to heal. Millions of people suffer from them, and the number is growing. They are costly to treat, and sometimes can result in amputation.

In particular, the incidence of Type 2 Diabetes is dramatically increasing. The Center for Disease Control estimates 30 million people currently have diabetes. Twenty-three million carry the diagnosis and 7 million are undiagnosed. As many as 7.5 million (25%) of this population will develop a diabetic foot ulcer. Management of these ulcers can add up to $13 billion to the cost of diabetes care.

Various devices are now in use that utilize an enzymatic process or a concentrator to deliver oxygen directly to the wound. These devices also aim to promote a moist wound environment. This is counterintuitive because oxygen has a very low diffusivity in water, on the order of $1/10,000$ of the diffusivity through air. This moisture layer prevents oxygen diffusion appropriately and makes our device far superior.

Wound healing requires oxygen, moisture and pressure offloading. However, diabetes-associated microvasculopathy compromises oxygen delivery to the tissues. Localized delivery of oxygen has been tried in the past, but has failed. While the exact mechanism of this failure is unknown, it has been attributed to the diffusion barrier of oxygen through water.

Hyperbaric oxygen therapy (HBOT), is an approved treatment for non-healing diabetic foot ulcers. It delivers 100% oxygen to the subject in a pressurized vessel. HBOT costs $15,000 to $40,000 per person over the course of treatment. There are a limited number of centers with HBO chambers. In order for HBOT to be successful, the patient must be ambulatory and capable of visiting the chamber an average of 30-60 times, with each visit lasting up to 2 hours.

In spite of considerable research, it remains difficult to effectively treat subjects with chronic wounds.

There is no admission that the background art disclosed in this section legally constitutes prior art.

SUMMARY OF THE INVENTION

In a first broad aspect, there is provided a wound dressing system that includes a membrane comprised of an oxygen-permeable material. The membrane has a first surface and a second surface with oxygen-permeable pillars extending from the second surface. Open spaces are defined between the pillars. The pillars have sidewalls and end surfaces that are oxygen permeable such that oxygen can diffuse through the pillars.

The membrane is configured to be exposed to oxygen such that oxygen can diffuse from the first surface through the oxygen-permeable material toward and through the pillars. In use, the pillars are placed adjacent to the wound to allow direct delivery of the oxygen into cells of the wound.

In use, the pillars are placed adjacent to the wound and are configured to allow direct delivery of the oxygen into cells of the wound. The wound can be one or more of a chronic wound, diabetic foot ulcer, venous stasis leg ulcer, or a pressure sore.

In certain embodiments, the wound dressing system further includes an oxygen delivery conduit within the membrane that allows oxygen to diffuse through the membrane and the pillars. In certain embodiment, the pillars are arranged in a micro-structured array.

In certain embodiments, the oxygen delivery conduit comprises a porous conduit that extends through the membrane.

In certain embodiments, the wound dressing further includes an oxygen delivery system operatively connected to the membrane. For example, the oxygen delivery system can be a supply of an oxygen-containing gas. Also, the supply of oxygen-containing gas comprises a portable canister or concentrator.

In certain embodiments, the wound dressing system further includes a tubing that operatively connect the oxygen delivery system to the membrane.

In certain embodiments, the wound dressing system further includes a bandage, or impermeable covering, that can be applied to the first surface of the membrane to allow the oxygen to diffuse in a direction toward the pillars.

In certain embodiments, the oxygen-permeable material comprises an organosilicon polymer. For example the organosilicon polymer can be comprised mostly of hydrophobic polydimethylsiloxane (PDMS) or be combined with a hydrophilic component to yield a copolymer that is hydrophilicized. Also, the oxygen-permeable material can further be comprised of a hydrogel; an organosilicon polymer; a crosslinker and a photoinitiator; or combinations thereof.

In another aspect, there is provided herein a method of treating a subject having a delayed healing, incompletely healing, or wound, promoting wound healing and/or promoting re-epithelialization of wounds, the method generally includes: placing a wound dressing system of claim 1 onto the wound, and delivering a quantity of oxygen to the wound dressing system.

In another aspect, there is provided herein a subject care kit for treating a wound that includes: at least one wound dressing system, and at least one delivery system configured to be operatively connected to the wound dressing system and to a supply of oxygen.

In certain embodiments, the delivery system includes at least one container containing a supply of oxygen-containing gas necessary to treat a wound, and a supply device that operably connects the membrane to the container. In certain embodiments, the container can include a regulator for controlling the amount of oxygen being delivered. For example, the oxygen-containing container can be provided in a single dosage form where the oxygen concentration and/or amount is known. Also, the container can be of a size that allows the subject to have mobility, while wearing the wound dressing system.

In certain embodiments, the kit further includes a restraining device to removably attach the container to an area adjacent to the wound being treated.

In certain embodiments, the kit can include multiple containers, and/or multiple membranes, and/or multiple restraining devices.

In certain embodiments, the kit can at least one bandage, or impermeable covering, that can be applied to the first surface of the membrane to allow the oxygen to diffuse in a direction toward the pillars. Also, the kit can further include one or more additional bandages that can be used as pressure providing mechanism to gently force at least the pillars of the membrane against cells in the wound.

In certain embodiments, the kit can contain a negative pressure wound therapy device to hold the membrane against tissue while assisting with fluid management of the wound bed.

In certain embodiments, the kit can further include instructions describing the proper use of the kit for treating chronic wounds.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT(S)

Figure 1A:
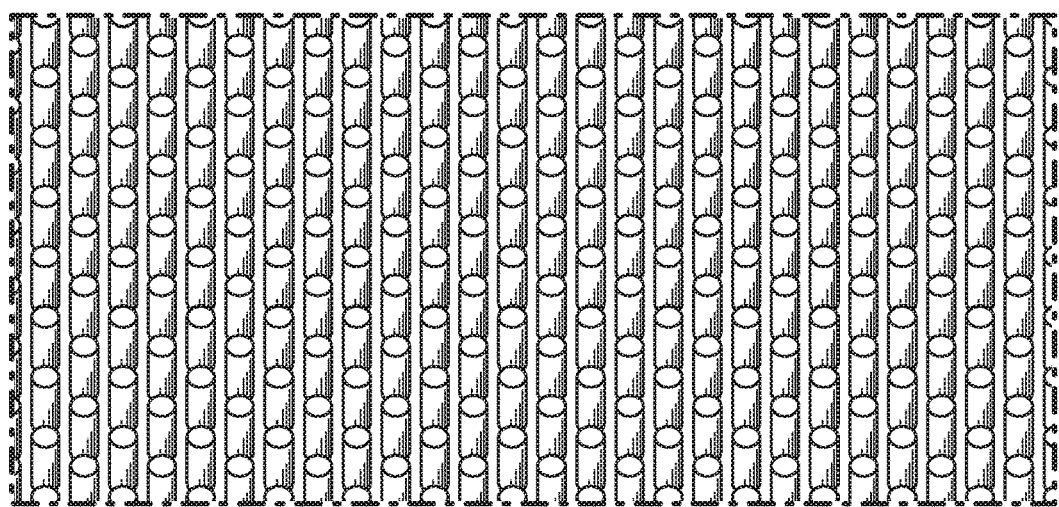
FIGS. 1A-1C. Illustrations of an oxygen permeable membrane having a plurality of pillars with substantially similar or uniform heights, diameters, and profiles.

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term unless the context clearly indicates otherwise.

As used herein, the singular forms "a", "an" and "the" include plural reference unless the context clearly dictates otherwise. Unless defined otherwise, all technical and scientific terms used herein have the same meanings as commonly understood by one of ordinary skill in the art. Although any methods similar or equivalent to those described herein can be used in the practice or testing of embodiments of the present invention, the preferred methods are now described. Nothing herein is to be construed as an admission that the invention is not entitled to antedate such disclosure by virtue of prior invention.

As used herein, the term "about" means plus or minus 10% of the numerical value of the number with which it is being used. Therefore, about 50% means in the range of 45%-55%.

As used herein, the terms "optional" or "optionally" may be taken to mean that the subsequently described structure, event or circumstance may or may not occur, and that the description includes instances where the event occurs and instances where it does not.

As used herein, the term "administering" when used in conjunction with a therapeutic means to administer a therapeutic directly into or onto a target tissue or to administer a therapeutic to a subject whereby the therapeutic positively impacts the tissue to which it is targeted.

As used herein, the terms "treat," "treating" or "treatment" generally mean the exposure of a living organism to one or more physical, chemical or psychological entities or stimuli that may prevent, improve or ameliorate a diseased state. As used herein, the term "treating" refers to both therapeutic treatment and prophylactic or preventative measures. Generally speaking, the term "tissue" refers to any aggregation of similarly specialized cells which are united in the performance of a particular function. For example, skin may be considered a tissue.

As used herein, the term "indication" generally refers to a medical condition or symptoms associated with a medical condition.

As used herein, "subject" refers to any mammal, including humans, domestic and farm animals, and zoo, sports, or pet animals, such as dogs, horses, cats, sheep, pigs, cows, etc. The preferred mammal herein is a human, including adults, children, and the elderly.

As used herein, "preventing" means preventing in whole or in part, or ameliorating or controlling.

As used herein, a "therapeutically effective amount" in reference to the compounds (such as oxygen-containing gas) or compositions refers to the amount sufficient to induce a sign or any other desired alteration that results in the promotion and/or improvement of wound healing, including rates of wound healing and closure of wounds, in whole or in part.

As use herein, the term "improves" generally means changes either the appearance, form, characteristics and/or the physical attributes of the tissue to which it is being provided, applied or administered.

As used herein, the terms/phrase "wound that does not heal at the/an expected rate" and/or "chronic would" are meant to be used interchangeably, and generally mean an injury to any tissue, including delayed or difficult to heal wounds (including delayed or incompletely healing wounds), and chronic wounds. Non-limiting examples of wounds that do not heal at the expected rate include ulcers, such as arterial ulcers, burn ulcers, diabetic ulcers, diabetic foot ulcers, decubitus ulcers, infectious ulcers, pressure ulcers, trauma-induced ulcers, and mixed ulcers, and other wounds that do not heal at expected rates. For example, chronic wounds, or wounds that do not heal at expected rates, such as delayed-healing wounds and incompletely healing wounds, which do not decrease in size by more than about 35% (+35%) over a standard-of-care treatment period using compression bandaging which do not increase in wound size by more than 15% (−15%).

One example of a delayed or difficult to heal wound may include, for example, a wound that is characterized by a decreased rate of epithelialization or closure. For example, wounds that do not heal within three months, for example, are considered chronic.

In a particular example, chronic wounds may include "diabetic ulcers." Diabetic subjects are prone to ulcerations, including foot ulcerations, due to both neurologic and vascular complications.

Another particular example of chronic wounds can include "burn ulcers", including 1st, 2nd and 3rd degree burns; scalding; chemical; electrical; explosion flash; and the like.

As used herein, "oxygen permeability" can refer to a material property which quantifies the material's ability to deliver oxygen through diffusion. For example, oxygen permeability can be specifically defined as D*k, where D is the diffusivity of the material, and k is the solubility of the material.

General Description

In one embodiment, the membrane is made with a hydrophobic silicone polymer to allow for optimal oxygen transport, as well as allowing for direct contact with tissue. The membrane can be used to deliver hydrophobic drugs, such as antibiotics directly to a wound.

In certain embodiments, the dressing system also contains an oxygenator apparatus which provides a way to oxygenate the membrane.

This technology is especially useful initially in subjects that are not candidates for hyperbaric oxygen therapy (HBOT) or are otherwise unable to sue other would treatment technologies.

For example, other devices utilize an enzymatic process or a concentrator to deliver oxygen directly to the wound. These devices also aim to promote a moist wound environment. This is counterintuitive because oxygen has a very low diffusivity in water, on the order of $1/10,000$ of the diffusivity through air. This moisture layer prevents oxygen diffusion appropriately and makes our device far superior.

The present dressing system overcomes the diffusion barrier of oxygen by using microfabrication of FDA approved silicone hydrogels.

A hydrophobic silicone polymer is made into a dressing with numerous fingerlike projections. The dressing connects to a compact oxygen source which the subject wears. This allows for a moist wound environment that is required to heal wounds.

In one embodiment, the dressing comprises a microfabricated oxygen permeable membrane described in Das et al. U.S. Pat. No. 9,670,447, the entire disclosure of which is expressly incorporated herein by reference.

For completeness of disclosure, the description of such microfabricated oxygen permeable membrane of Das et al. '447 is repeated herein.

Oxygen permeable materials suitable for making the microfabricated arrays disclosed herein can be made of biocompatible materials amenable to microfabrication and having a suitably high oxygen permeability to support cellular growth and sufficient structural permanence to maintain the array in a desired topography. The microfabricated materials are fabricated and not naturally occurring.

A "hydrogel" or "hydrogel material" refers to a polymeric material which can absorb at least 10 percent by weight of water when it is fully hydrated. A "silicone hydrogel" refers to a silicone-containing hydrogel obtained by copolymerization of a polymerizable composition comprising at least one silicone-containing monomer or at least one silicone-containing macromer or at least one crosslinkable silicone-containing prepolymer. "Hydrophilic," as used herein, describes a material or portion thereof that will more readily associate with water than with lipids. "Molecular weight" of a polymeric material (including monomeric or macromeric materials), as used herein, refers to the weight-average molecular weight unless otherwise specifically noted or unless testing conditions indicate otherwise. "Polymer" means a material formed by polymerizing one or more monomers.

Blood vessel mimetics are microfabricated structures that mimic the structure and function of microvessels such as capillaries. In particular embodiments, blood vessel mimetics are pillars on a microfabricated membrane and the blood vessel mimetics can be arranged in an array to mimic physiologic and anatomic features of microvessels, particularly those features relevant to the delivery of oxygen.

A microfabricated array refers to an article having a microscopically visible topography in an ordered or selected arrangement. A microfabricated membrane is a manufactured, non-naturally occurring membrane.

A hydrogel is a hydrated cross-linked polymeric system that contains water in an equilibrium state. A number of hydrogels typically are biocompatible, making them a widely-used material for producing biomedical devices; some hydrogels also have high oxygen permeability. Conventional hydrogels are prepared from monomeric mixtures predominantly containing hydrophilic monomers, such as, 2-hydroxyethyl methacrylate or N-vinyl pyrrolidone. U.S. Pat. Nos. 4,495,313, 4,889,664 and 5,039,459 disclose some conventional hydrogels. Oxygen permeability of these conventional hydrogel materials relates to the water content of the materials, and is typically below 20-30 barriers.

Silicone-containing polymers generally have higher oxygen permeabilities than conventional hydrogels. Silicone hydrogels can be prepared, for example, by curing mixtures containing at least one silicone-containing monomer and at least one hydrophilic monomer. Either the silicone-containing monomer or the hydrophilic monomer may function as a crosslinking agent (a crosslinking agent is a monomer having multiple polymerizable functionalities) or a separate crosslinking agent may be employed. Examples of silicone hydrogels have been disclosed in U.S. Pat. Nos. 4,954,587, 5,010,141, 5,079,319, 5,115,056, 5,260,000, 5,336,797, 5,358,995, 5,387,632, 5,451,617, and 5,486,579, as well as in WO 96/31792.

Polymeric organosilicon compounds are commonly referred to as silicones, and include polymers such as polydimethylsiloxane (PDMS).

Membranes as described herein can be fabricated from various materials. As one specific example, the hydrogel material can include a mixture of 1 mL DMA, 4 mL TRIS, 1 mL methacryloxypropyl terminated PDMS, 0.36 mL NVP, 0.05 mL EGDMA, and 0.051 mL IRGACURE 2100, which are mixed thoroughly by sonication in a Branson 1510 ultrasonic waterbath (such as is commercially available from Emerson Industrial Automation) for 30 seconds three times. As another example, the membrane can be formed from a polyalkoxy siloxane such as polydimethoxylsiloxane (see e.g., U.S. Patent Application Publication Nos. 2008/0085986 and 2013/0178585). As other specific examples, polyethylene glycol (PEG) gels made from crosslinking PEGDA or PEGDMA, or hyaluronic acid gels, in some cases containing silicone components, can be used to form the membrane.

Many other biocompatible, oxygen permeable silicone elastomers can be used to form the membrane. For example, a suitable membrane can be made of a polymeric organo-silicon material having elastic solid properties, such as polydimethylsiloxane (PDMS), or a hydrogel containing PDMS. In some cases, a membrane can be completely fabricated from PDMS (e.g., Dow-Corning Sylgard 184) alone.

The silicone hydrogel composition described above includes DMA, which is hydrophilic and thus serves to make the compound more hydrophilic than PDMS. The relatively hydrophilic compound provides some advantages over hydrophobic compounds in protein adsorption which can help improve cell adhesion. Some of the alternative materials described above (e.g., polydimethylsiloxane), however, have been found to provide some benefits in reproducibility of molds and reduced shearing of the pillars during fabrication.

Suitable materials can in various embodiments be biocompatible, sterilizable, amenable to microfabrication, have high oxygen permeability, can be at least temporarily rendered hydrophilic, and/or can be optically clear with relatively low autofluorescence, to enable convenient optical inspection of cell growth in situ. In some cases, the materials described herein as suitable for use as a membrane can have a diffusivity that is about 1.5 to 2 times that of water and can have a solubility of oxygen that is about 8 times that of water.

Figure 1B:
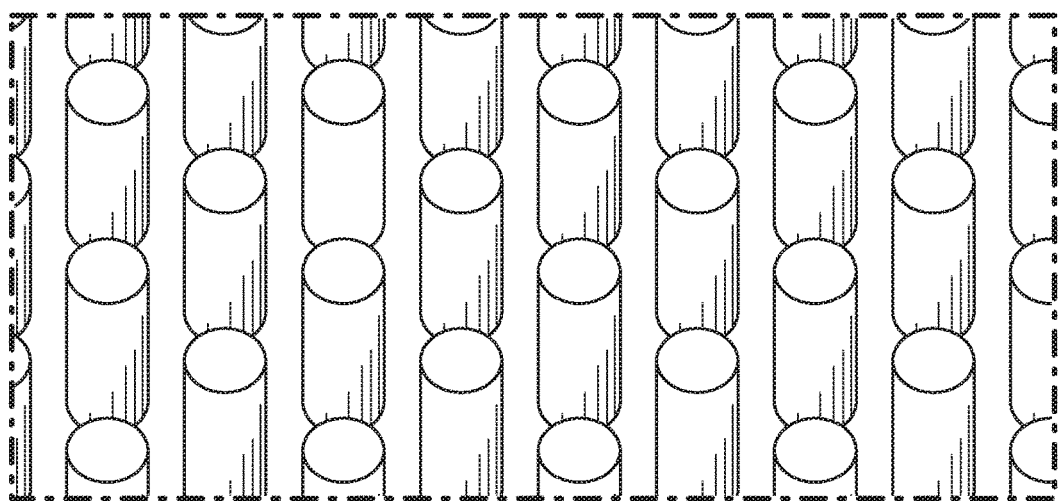
Figure 1C:
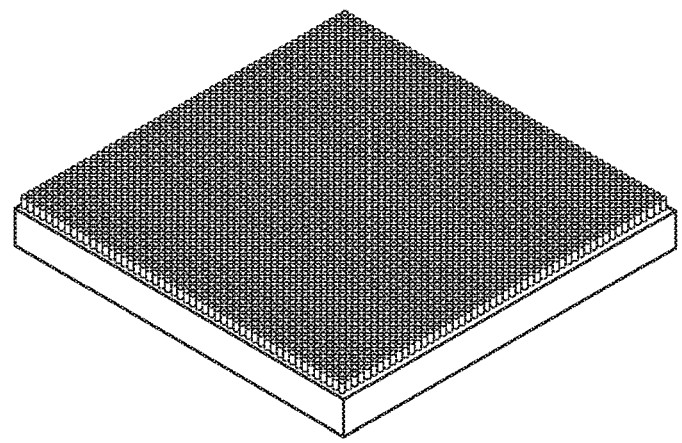

FIGS. 1A-1C are illustrations of an oxygen permeable membrane having a plurality of pillars with substantially similar or uniform heights, diameters, and profiles.

Figure 2:
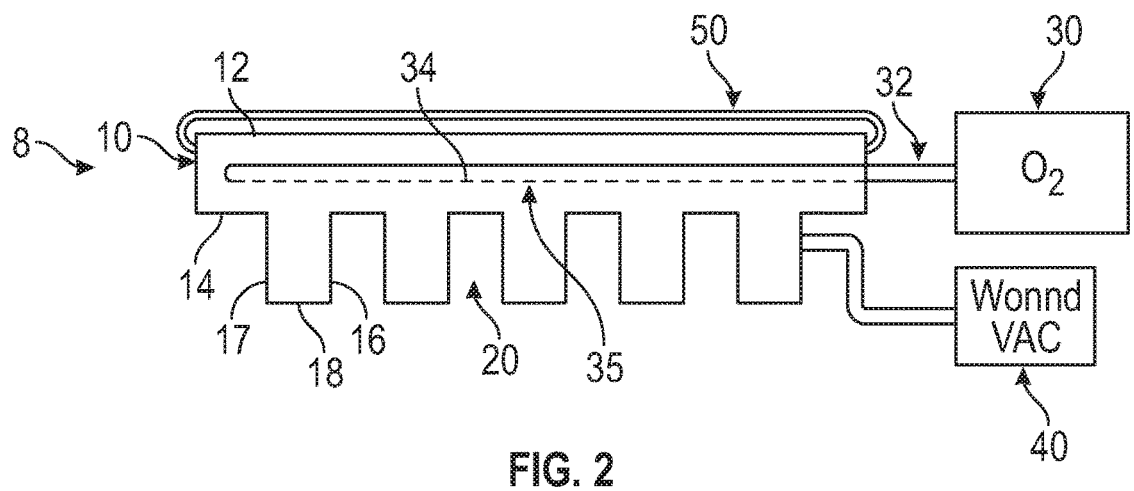
FIG. 2. Schematic illustration of a cross-section of an oxygen permeable membrane having a plurality of pillars.

FIG. 2 is a schematic illustration of a cross-section of an oxygen permeable membrane 10 having a plurality of pillars 12.

However, it is to be understood that—in other embodiments, the membrane can have a plurality of pillars arranged in a predetermined pattern such as a plurality of grid like structures, and that the pillars can have various sizes in different embodiments. In the illustrated examples, each membrane has pillars of substantially similar shapes. In other embodiments, the pillars can be arranged on a hexagonal or any other suitable grid, or set of sub-grids of varying pillar arrangements (e.g., to facilitate multiplex experiments associated with the effects of pillar spacing and corresponding oxygen gradients).

It is to be understood that the pillars may be substantially cylindrical, upright, or titled slightly. The diameter of a pillar can be substantially uniform along its length, or it can have an intermediate, tapered portion. However, the pillars in some embodiments are not tapered from their base on the membrane to their tip, as in a conical or frustoconical shape.

It is advantageous that the pillars of the membrane can be fabricated with a relatively high aspect ratio of height to width. Pillars which are significantly taller than they are wide can more accurately reflect the vasculature of native biological tissue.

Thus, the pillars can have a height which is at least about 1 μm. In specific embodiments, the pillars can have diameters between about 1 and 100 μm and heights between about 1 μm and 1 mm. More specifically, pillars can have diameters between about 10 and 100 μm and heights between about 100 and 450 μm, or diameters between about 15 and 100 μm and heights between about 100 and 300 μm or heights between about 200 and 350 μm. Even more specifically, pillars can have diameters between about 25 and 100 μm and heights between about 200 and 275 μm. Even more specifically, pillars can have diameters between about 25 and 100 μm and heights between about 200 and 250 μm.

As one specific example, pillars can have a height of 264 μm and a diameter of 35 μm, and thus an aspect ratio (ratio of height to diameter) of over 7.5. In experiments, aspect ratios of about 20 have been achieved, and the pillars can be formed with aspect ratios larger than 20. In some cases, pillars having aspect ratios of at least about 2 to about 4 can be particularly advantageous. For example, pillars can have aspect ratios between about 2 and about 10. For pillars that do not have a uniform diameter, an average diameter and an average width may be used to determine the aspect ratio.

In some embodiments, all pillars have substantially the same dimensions. In other embodiments, the pillars need not have the same dimensions and can have differing dimensions.

The pillars can be arranged in arrays of pillars. As one example, a regular array or matrix of 10,000 pillars arranged in 100 rows of 100 pillars can fit in a total area of 5 mm by 5 mm, or 25 mm$^2$. Thus, a membrane 10 can have a pillar density of around 400 pillars/mm$^2$, for example 300-500 pillars/mm$^2$. In various embodiments, the pillar density can be greater than or less than 400 pillars/mm$^2$. In one embodiment, the pillars can be spaced apart by about 200 μm (measured edge to edge), which allows for the development of a 100 μm oxygen gradient around each pillar, consistent with in vivo capillary density. In other embodiments, the pillars can be spaced closer to or father from one another, for example, the pillars can be spaced by between about 70 and 800 μm. In some cases, a larger pillar spacing can help to facilitate spatial imaging of the effects of oxygen gradient. A single membrane can include a plurality of arrays of pillars.

FIG. 2 is a schematic illustration of a wound dressing system having a membrane 10 operatively connected to a supply 30 of an oxygen-containing gas 30.

The membrane 10 has a first surface 12 and a second surface 14, from which extends a plurality of pillars 16. Each pillar 16 has sidewalls 17 and a distal end 18. Interstitial spaces 20 are present between the pillars 16. In use, the interstitial spaces 20 are in an aqueous environment created by the cells. The dressing 8 allows delivery of a hundred percent oxygen through the distal end 18 of the pillars 16, such that the oxygen is continuously delivered to the wound.

In the schematic illustration shown, the wound dressing system 8 includes an oxygen delivery system 30 which is operatively connected to the membrane 10 via a gas supply device, or tubing, 32. In certain embodiments, the oxygen delivery system 30 can be a permanent supply, such as provided by a hospital. In other embodiments, as described in below, the oxygen delivery system can be a container, or canister, 42 containing oxygen.

Also, in certain treatment methods, a wound vacuum system 40 can be used connection with the dressing system 8 to remove the seepage from the healing cells of the wound.

Also in certain treatment methods, a bandage, or impermeable covering, 50 can be applied to the first surface 12 of the membrane 10 to allow the oxygen to diffuse in a direction toward the pillars 16, and not into the atmosphere. In the other embodiments, it is to be understood that one or more additional bandages 50 can be used as pressure providing mechanism to gently force the pillars against the healing cells.

In one embodiment, the membrane 10, as shown in FIG. 2, can have an internal oxygen-delivery system 34, such as a conduit, within the membrane 10. The conduit 34 can be at least partially porous or having openings 35 that direct the oxygen toward the wound. In one embodiment, the conduit 34 can be positioned in a back-and-forth configuration so that much of the membrane 10 has the conduit 34 extending therethrough.

Figure 3:
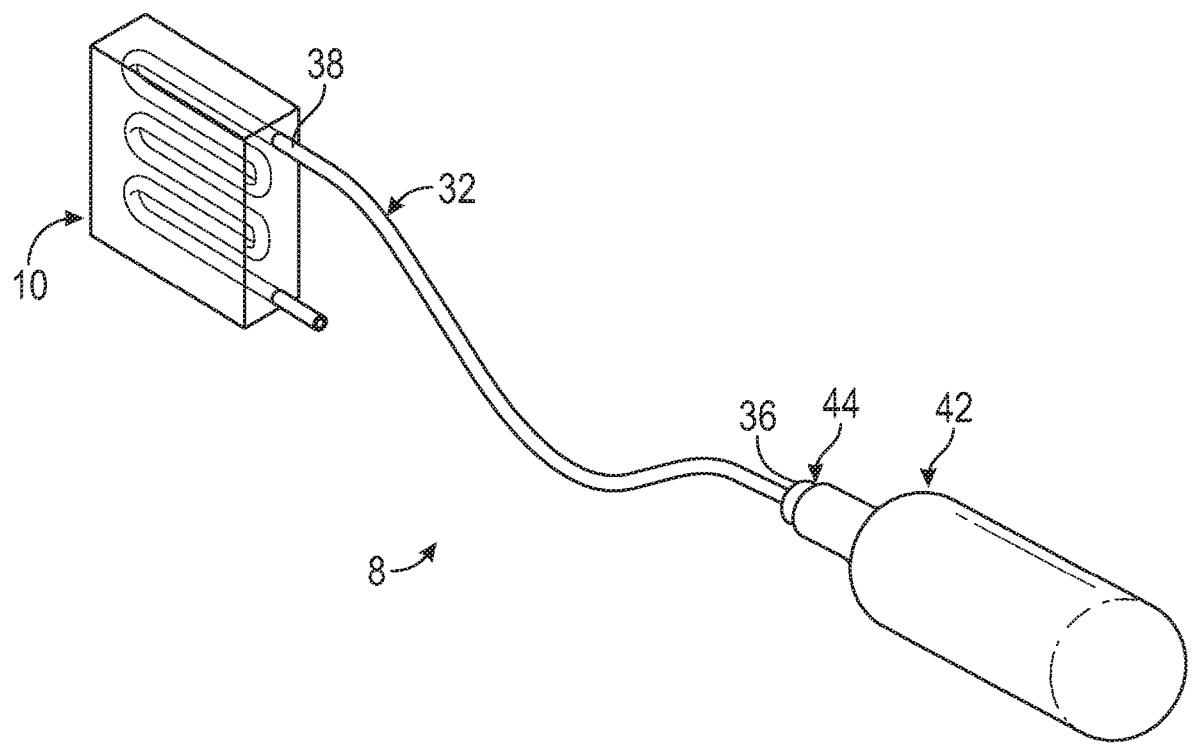
FIG. 3. Schematic perspective top view of a dressing system having an oxygen tubing positioned through a silicone membrane, where patterning of pillars is not shown.
Figure 4:
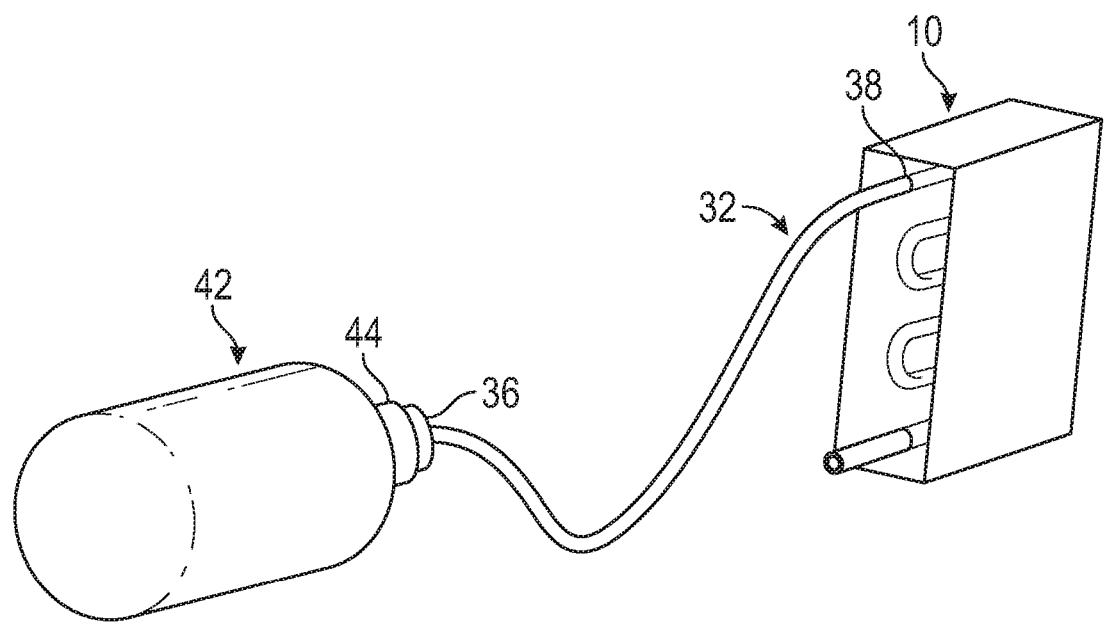
FIG. 4. Schematic perspective bottom view of a dressing system showing a patterned opaque membrane.
Figure 5:
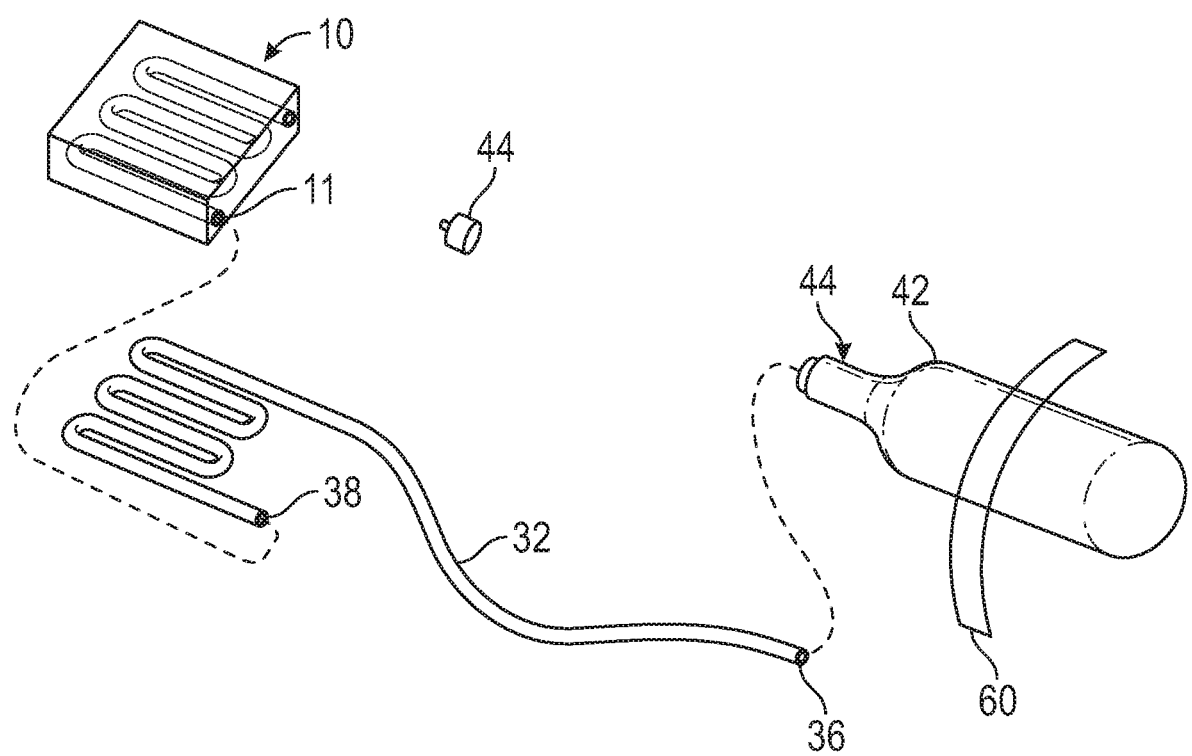
FIG. 5. Schematic perspective exploded view of components of a dressing system, including a silicone membrane, oxygen delivery tubing, a compressed oxygen container/canister, and pinhole regulator for such canister.

FIGS. 3-5 show one configuration of an oxygen delivery system 8 having the membrane 10 connected to the canister 42 by the tubing 32. A first end 36 of the tubing 32 can be connected to the canister 42, and a second end 38 of the tubing 32 can be connected to the membrane 10. FIG. 5 provides an exploded view, showing the membrane 10 with an opening 11 that is configured to receive the second end 38 of the tubing 32. In certain embodiments, the first end 36 of the tubing 32 can be operatively connected to a regulator 44 on the canister 42 for controlling the amount of oxygen being delivered.

It is to be understood, that in certain embodiments, the oxygen-containing gas may be provided in a single, concentrated form where the oxygen concentration is known. For example, the canister 42 may be of a size that allows the subject to have mobility, while wearing the wound dressing system. In such embodiments, a restraining device 60, such as a supply of tape or clips, can used to removably attach the canister to an area adjacent to the wound being treated.

EXAMPLES

Certain embodiments of the present invention are defined in the Examples herein. It should be understood that these Examples, while indicating preferred embodiments of the invention, are given by way of illustration only. From the above discussion and these Examples, one skilled in the art can ascertain the essential characteristics of this invention, and without departing from the spirit and scope thereof, can make various changes and modifications of the invention to adapt it to various usages and conditions.

Figure 6:
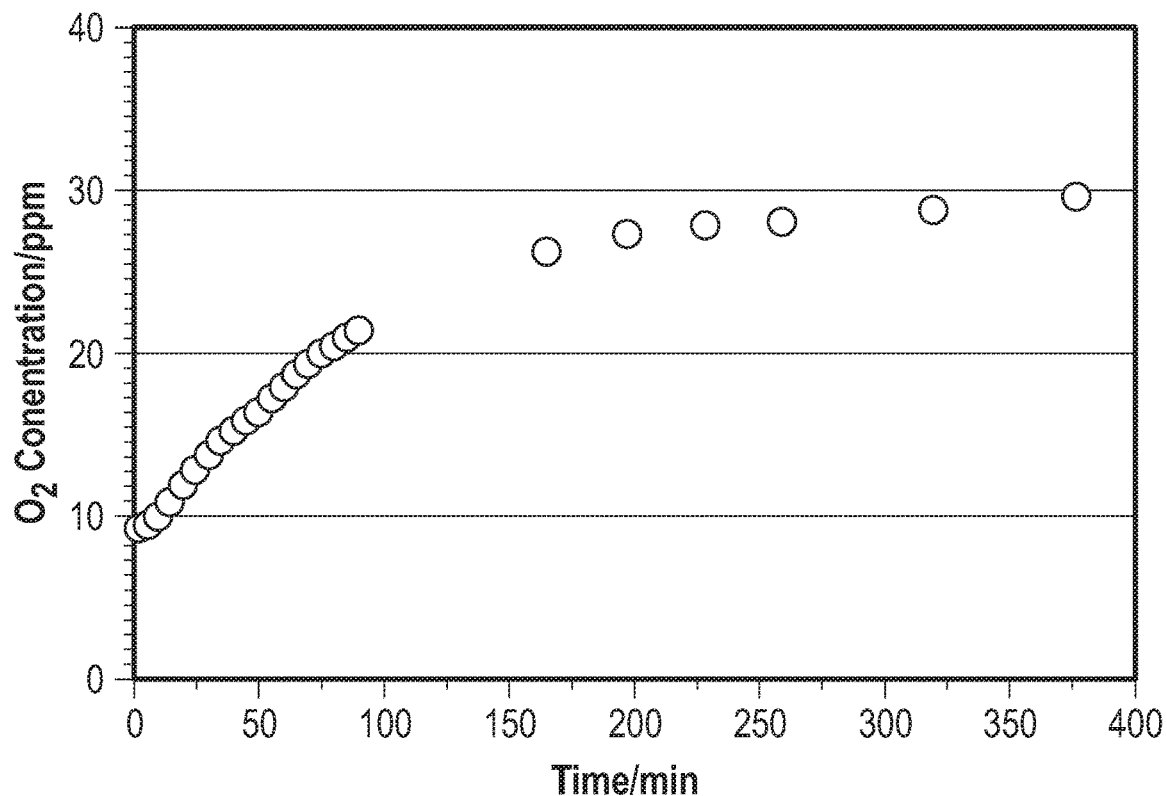
FIG. 6. Graph showing oxygen dissolution from membrane surface, $O_2$ concentration/ppm from 0 to 450 minutes.

FIG. 6 shows the oxygen dissolution from membrane surface, $O_2$ concentration/ppm from 0 to 450 minutes.

Figure 7:
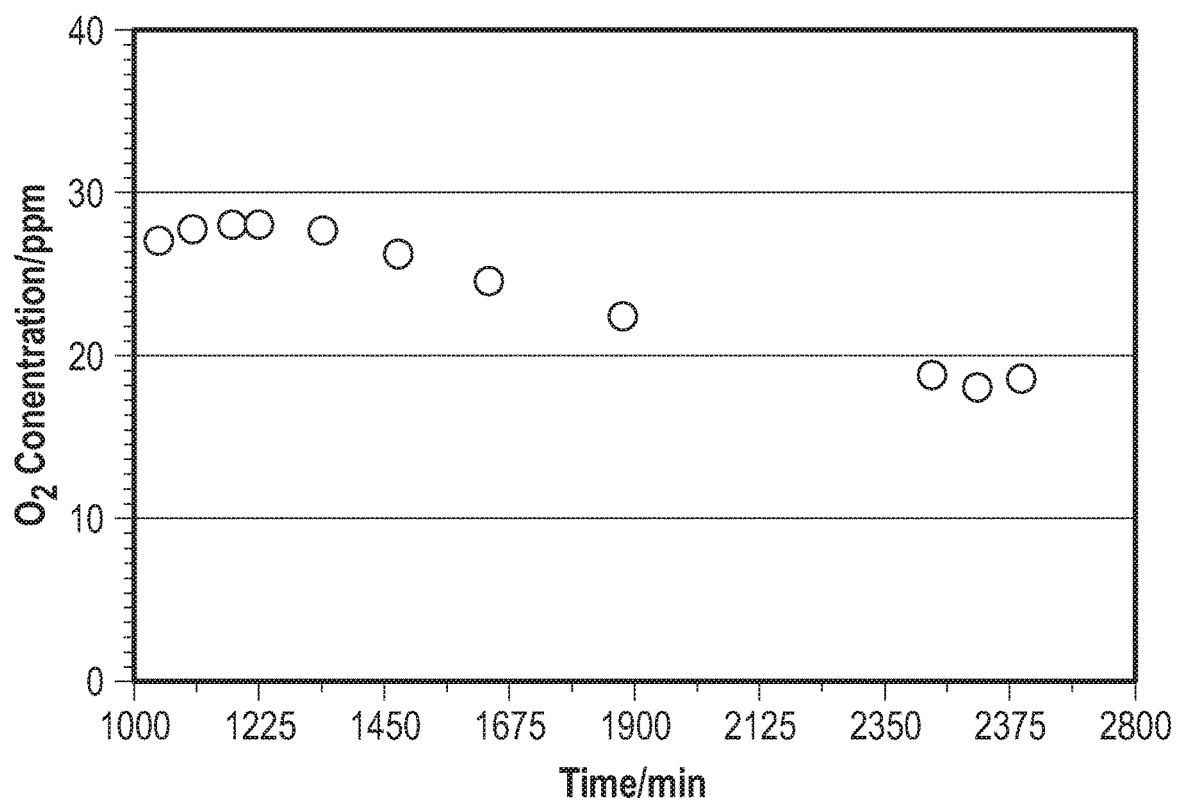
FIG. 7. Graph showing oxygen dissolution from membrane surface, $O_2$ concentration/ppm from 1,000 to 2,800 minutes.

FIG. 7 shows the oxygen dissolution from membrane surface, $O_2$ concentration/ppm from 1,000 to 2,800 minutes.

Wound Treatment

In instances of tissue damage (particularly with wounds characterized by delayed healing and chronic wounds) the wound dressing system described herein is effective in promoting the wound healing process. The wound dressing system is especially useful for the treatment of chronic wounds and/or wounds that do not heal at expected rates.

In one aspect, there is provided a method of promoting or improving wound healing in a subject suffering from or a chronic wound, delayed healing wound or incomplete healing wound, or other wounds that do not heal at expected rates, comprising covering the wound with the oxygen-permeable material, and administering a therapeutically effective amount of an oxygen-containing gas effective to the oxygen-permeable material sufficient to promote wound healing.

In another aspect, there is provided a method of reducing, preventing or ameliorating tissue damage in a subject suffering from a chronic wound, delayed healing wound or incomplete healing wound, or other wound that does not heal at an expected rate, comprising covering the wound with the oxygen-permeable material, and administering a therapeutically effective amount of an oxygen-containing gas effective to the oxygen-permeable material sufficient to promote wound healing.

In one aspect, the method includes the sustained administration of the oxygen-containing gas to the wound. In one embodiment, the oxygen-containing gas is administered for at least about 1-24 hours/day, at least about 0.5 hours, at least about 1 hour, at least about 2 hours, at least about 3 hours, at least about 4 hours, at least about 5 hours, at least about 6 hours, at least about 7 hours, at least about 8 hours, at least about 9 hours, at least about 10 hours, at least about 11 hours, at least about 12 hours or at least about 24 hours.

Kits

The internal wound dressing system described herein may be assembled and provided in the form of kits. In some embodiments, the kit provides at least one oxygen-permeable membrane, at least one container containing a supply of oxygen-containing gas necessary to treat a wound, and a supply device operably connects the membrane to the container.

The oxygen-containing gas may be provided in a single dosage form where the oxygen concentration and/or amount is known. For example, the container may be of a size that allows the subject to have mobility, while wearing the wound dressing system. In such embodiments, the kit can optionally contain a restraining device to removably attach the container to an area adjacent to the wound being treated.

In certain embodiments, the kit can contain multiple replaceable containers, and/or multiple membranes, and/or multiple restraining devices.

The kits may further include instructions for using the components of the kit to practice the subject methods. The instructions for practicing the subject methods are generally recorded on a suitable recording medium. For example, the instructions may be present in the kits as a package insert or in the labeling of the container of the kit or components thereof. In other embodiments, the instructions are present as an electronic storage data file present on a suitable computer readable storage medium, such as a flash drive. In other embodiments, the actual instructions are not present in the kit, but means for obtaining the instructions from a remote source, such as via the internet, are provided. An example of this embodiment is a kit that includes a web address where the instructions can be viewed and/or from which the instructions can be downloaded. As with the instructions, this means for obtaining the instructions is recorded on a suitable substrate.

While the invention has been described with reference to various and preferred embodiments, it should be understood by those skilled in the art that various changes may be made and equivalents may be substituted for elements thereof without departing from the essential scope of the invention. In addition, many modifications may be made to adapt a particular situation or material to the teachings of the invention without departing from the essential scope thereof.

Therefore, it is intended that the invention not be limited to the particular embodiment disclosed herein contemplated for carrying out this invention, but that the invention will include all embodiments falling within the scope of the claims.

What is claimed is:
1. A wound dressing system, comprising:
   a membrane comprising an oxygen-permeable material, the membrane having a first surface and a second surface with oxygen-permeable pillars extending from the second surface;
   interstitial spaces defined between the pillars;
   a covering applied to the first surface; and
   an oxygen delivery conduit within the membrane that allows oxygen to diffuse through the membrane and the pillars, the oxygen delivery conduit being positioned in a back-and-forth configuration within the membrane;

wherein the pillars have sidewalls and end surfaces that are oxygen permeable and through which oxygen can diffuse three-dimensionally between and around the pillars;

wherein the membrane is configured to be exposed to oxygen such that oxygen can diffuse from the first surface through the oxygen-permeable material toward and through the pillars;

wherein the pillars are configured to be placed adjacent to a wound and allow direct delivery of the oxygen into cells of the wound; and wherein the pillars have an aspect ratio between about 2 and about 10.

2. The wound dressing system of claim 1, wherein the oxygen delivery conduit comprises a porous conduit that extends through the membrane.

3. The wound dressing system of claim 1, further including an oxygen delivery system operatively connected to the membrane.

4. The wound dressing system of claim 3, wherein the oxygen delivery system comprises a supply of an oxygen-containing gas.

5. The wound dressing system of claim 4, wherein the supply of oxygen-containing gas comprises a portable canister.

6. The wound dressing system of claim 3, further including tubing that operatively connects the oxygen delivery system to the membrane.

7. The wound dressing system of claim 1, wherein the oxygen-permeable material comprises an organosilicon polymer.

8. The wound dressing system of claim 7, wherein the organosilicon polymer comprises polydimethylsiloxane (PDMS) hydrophilicized by surface treatment or copolymerization with hydrophilic polymers.

9. The wound dressing system of claim 7, wherein the oxygen-permeable material further comprises: a hydrogel; a crosslinker and a photoinitiator; or combinations thereof.

10. The wound dressing system of claim 1, wherein the pillars are arranged in a micro-structured array.

11. A method of treating a subject having a wound, the method comprising:
placing a wound dressing system of claim 1 onto the wound, and
delivering a quantity of oxygen to the wound dressing system.

12. The method of claim 11, wherein the wound is a chronic wound, diabetic foot ulcer, venous stasis leg ulcer, or pressure sore.

13. A subject care kit for treating a wound, the kit comprising:
at least one wound dressing system of claim 1, and
at least one delivery system configured to be operatively connected to the wound dressing system and to a supply of oxygen.

14. The kit of claim 13, wherein the delivery system includes at least one container containing a supply of oxygen-containing gas, and a supply device that operably connects the membrane to the container.

15. The kit of claim 14, wherein the container is provided in a single dosage form where the oxygen concentration and/or amount is known.

16. The kit of claim 14, wherein the container is of a size that allows the subject to have mobility while wearing the wound dressing system.

17. The kit of claim 14, wherein the container includes a regulator for controlling the amount of oxygen being delivered.

18. The kit of claim 14, comprising multiple containers, multiple membranes, or multiple restraining devices.

19. The kit of claim 14, further including a restraining device to removably attach the container to an area adjacent to the wound being treated.

20. The kit of claim 13, further including one or more bandages or additional coverings that can be used as pressure providing mechanisms to gently force at least the pillars of the membrane against cells in the wound.

21. The kit of claim 13, further including instructions describing the proper use of the kit for treating chronic wounds.

* * * * *